US010352143B2

(12) United States Patent
Siluni

(10) Patent No.: US 10,352,143 B2
(45) Date of Patent: Jul. 16, 2019

(54) BLOWDOWN METHOD FOR THERMAL RECOVERY PROCESSES

(71) Applicant: CONOCOPHILLIPS COMPANY, Houston, TX (US)

(72) Inventor: Gamage Siluni, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 15/920,932

(22) Filed: Mar. 14, 2018

(65) Prior Publication Data

US 2018/0266224 A1   Sep. 20, 2018

Related U.S. Application Data

(60) Provisional application No. 62/470,922, filed on Mar. 14, 2017.

(51) Int. Cl.
*E21B 43/25* (2006.01)
*E21B 43/24* (2006.01)
*C09K 8/594* (2006.01)
*C09K 8/592* (2006.01)

(52) U.S. Cl.
CPC .......... *E21B 43/2408* (2013.01); *C09K 8/592* (2013.01); *C09K 8/594* (2013.01); *E21B 43/255* (2013.01)

(58) Field of Classification Search
CPC ... E21B 43/2408; E21B 43/255; C09K 8/592; C09K 8/594
USPC ...................................... 166/272.3
See application file for complete search history.

(56) References Cited

U.S. PATENT DOCUMENTS

| | | | | |
|---|---|---|---|---|
| 3,454,095 A | * | 7/1969 | Webster | C09K 8/592 166/270.2 |
| 3,862,044 A | * | 1/1975 | Christopher | C09K 8/58 507/203 |
| 4,166,504 A | * | 9/1979 | Brown | C09K 8/592 166/272.4 |
| 2010/0152071 A1 | * | 6/2010 | Pope | C09K 8/86 507/261 |
| 2014/0332209 A1 | | 11/2014 | Wickramathilaka | |

* cited by examiner

*Primary Examiner* — Silvana C Runyan
(74) *Attorney, Agent, or Firm* — Boulware & Valoir

(57) ABSTRACT

A method of blowdown for a steam chamber of a thermal recovery process is provided. A blowdown mixture is introduced into the steam chamber. The blowdown mixture can include glycol and water. Heat can be adsorbed from the steam chamber onto the blowdown mixture. A viscosifying agent can also be introduced into the steam chamber. Oil from the steam chamber can be emulsified with the viscosifying agent to produce oil or emulsions of oil. The blowdown mixture and the oil or emulstions of oil can both be recovered from the steam chamber.

18 Claims, 1 Drawing Sheet

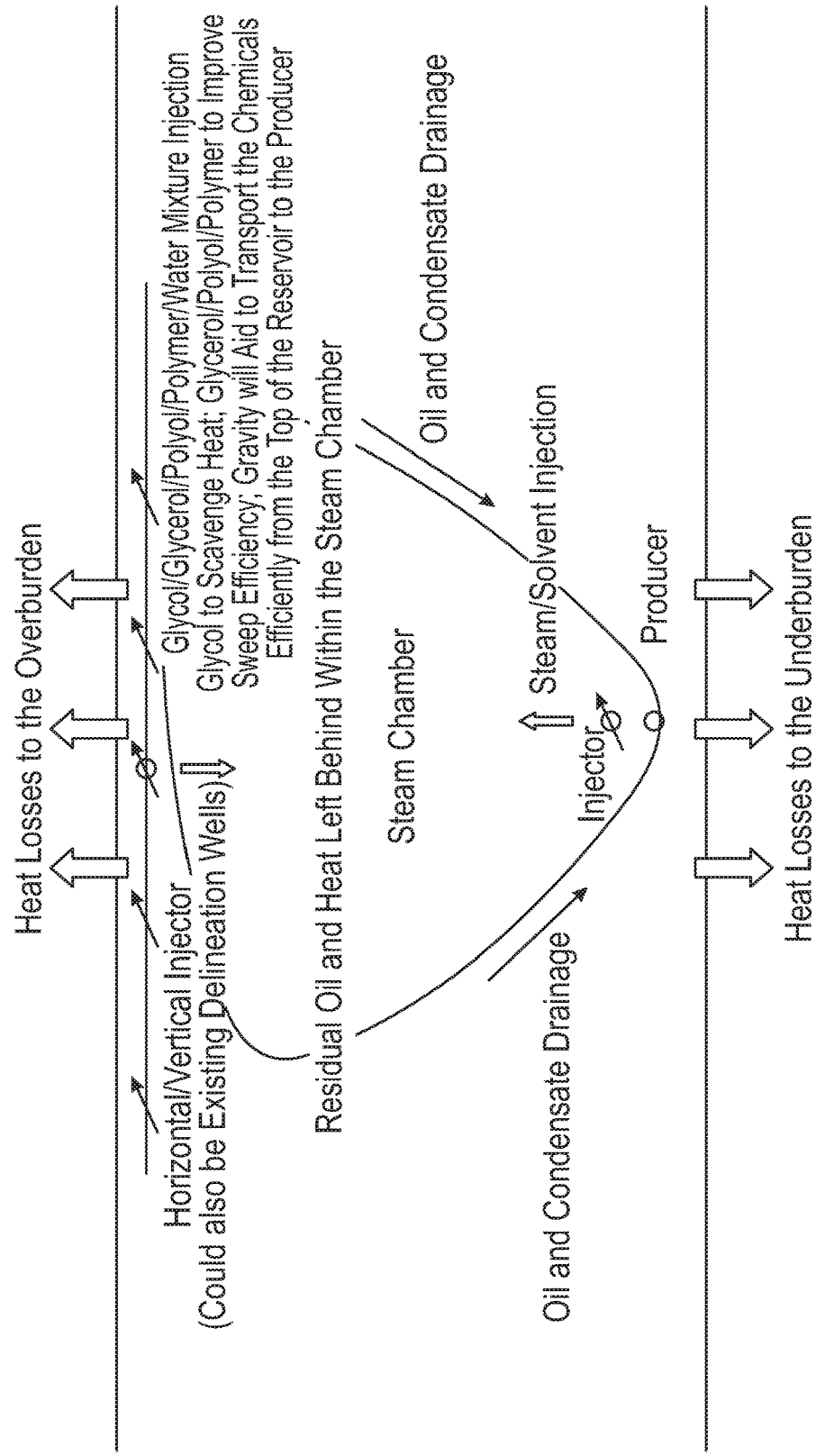

BLOWDOWN METHOD FOR THERMAL RECOVERY PROCESSES

CROSS-REFERENCE TO RELATED APPLICATIONS

This application is a non-provisional application which claims benefit under 35 USC § 119(e) to U.S. Provisional Application Ser. No. 62/470,922 filed Mar. 14, 2017, entitled "BLOWDOWN METHOD FOR THERMAL RECOVERY PROCESS," which is incorporated herein in its entirety.

STATEMENT REGARDING FEDERALLY SPONSORED RESEARCH

None.

FIELD OF THE INVENTION

The present invention relates generally to thermal recovery processes. More particularly, but not by way of limitation, embodiments of the present invention provide a method of blowdown for a steam chamber of a thermal recovery process.

BACKGROUND OF THE INVENTION

Several types of thermal recovery processes have been utilized for hydrocarbon recovery from subterranean formations. Examples of thermal recovery processes include steam assisted gravity drainage (SAGD), expanding solvent steam assisted gravity drainage (ES-SAGD) and cyclic steam stimulation (CSS).

Significant amounts of oil and/or heat could be left behind in the steam chamber of the subterranean formation after thermal recovery. It is desired to investigate post-thermal recovery processes that could recover and collect any remaining oil and/or heat to make the entire thermal recovery process more efficient and economical.

It has been previously proposed to inject a non-condensable gas into the steam chamber through a horizontal injector after steam injection. This method may recover some additional oil, but will not be able to produce the desired sweep efficiency. Furthermore, gas injection will not provide any heat scavenging from the steam chamber.

BRIEF SUMMARY OF THE DISCLOSURE

In certain illustrative embodiments, a method of blowdown for a steam chamber of a thermal recovery process is provided. A blowdown mixture is introduced into the steam chamber. The blowdown mixture can include glycol and water. Heat can be adsorbed from the steam chamber onto the blowdown mixture. A viscosifying agent can also be introduced into the steam chamber. Oil from the steam chamber can be viscosified with the viscosifying agent to increase the sweep efficiency and produce oil. The blowdown mixture and emulsified oil can both be recovered from the steam chamber.

In certain aspects, the heat from the steam chamber can be adsorbed onto the glycol in the blowdown mixture. The blowdown mixture and the viscosifying agent can be introduced into the steam chamber after shut-in of steam injection. The rate of steam injection into the steam chamber can be reduced prior to blowdown. The pressure of injected steam into the steam chamber can also be reduced prior to blowdown. The temperature of the injected steam is therefore reduced prior to blowdown.

The steam injection into the steam chamber can occur via the injector well. The blowdown mixture and the viscosifying agent can be recovered from the producer well. The blowdown mixture and the viscosifying agent can also be recovered from both the producer well and the injector well.

In certain aspects, the thermal recovery process can include, without limitation, steam assisted gravity drainage, expanding solvent steam assisted gravity drainage and cyclic steam stimulation.

In certain aspects, the blowdown mixture and the viscosifying agent can travel through the steam chamber via gravity drainage. The blowdown mixture and the viscosifying agent can be injected into the steam chamber from one or more of a delineation well and a horizontal well. The horizontal well can be disposed above the steam chamber. The viscosifying agent can include a polyol. The polyol can include one or more of glycerol and/or a polymer in water. The glycerol can include one or more of ethylene glycol and propylene glycol. The polymer can include one or more of polyacrylamide and polysaccharide.

In certain illustrative embodiments, a method of recovering primary oil and residual oil from a steam chamber in a reservoir is provided. This method could be applied to a thermal recovery process with a steam chamber. The thermal recovery process can include steam injection into the steam chamber, recovering primary oil from the steam chamber, terminating steam injection into the steam chamber, introducing a blowdown mixture and a viscosifying agent into the steam chamber, adsorbing heat from the steam chamber onto the blowdown mixture, sweeping the residual oil in the steam chamber with the viscosifying agent and both recovering the blowdown mixture and oil from the steam chamber. The produced oil may be an emulsion that had been formed with the viscosifying agent and the oil. In certain aspects, the thermal recovery process can be, for example, steam assisted gravity drainage, expanding solvent steam assisted gravity drainage or cyclic steam stimulation. The reservoir can be an oil sand reservoir.

BRIEF DESCRIPTION OF THE DRAWINGS

A more complete understanding of the present invention and benefits thereof may be acquired by referring to the following description taken in conjunction with the accompanying drawings in which:

FIG. 1 is an illustration of a blowdown method for a steam chamber in an illustrative embodiment.

While certain embodiments will be described in connection with the preferred illustrative embodiments shown herein, it will be understood that it is not intended to limit the invention to those embodiments. On the contrary, it is intended to cover all alternatives, modifications, and equivalents, as may be included within the spirit and scope of the invention as defined by the claims.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

FIG. 1 is an illustration of a blowdown method for a steam chamber in an illustrative embodiment of the presently disclosed subject matter. The blowdown method can be utilized to recover additional oil and heat from a reservoir of the steam chamber after implementing steam assisted gravity drainage or a similar thermal recovery process.

In certain illustrative embodiments, the blowdown method can be implemented as a late life process after a thermal recovery process such as steam assisted gravity drainage (SAGD), expanding solvent steam assisted gravity drainage (ES-SAGD) or cyclic steam stimulation (CSS) has already been implemented to recover primary oil. The presently disclosed blowdown method can utilize existing delineation wells. The presently disclosed blowdown method can also be implemented with horizontal wells drilled at the top of the reservoir. A set of chemical mixtures can be injected in sequence into a depleted steam chamber to recover heat and residual oil left behind within the chamber. The blowdown method can enhance oil production from these wells as well as reduce operation costs due to recovered heat being utilized to generate additional steam.

In certain illustrative embodiments, the steam injection rate and steam injection pressure can be gradually declined towards the end of a thermal recovery process. This will decrease the required steam injection temperature, thus reducing the amount of energy required to produce steam towards the end of the process. Once the steam injection is shut in, a selected blend of chemicals can be injected into the reservoir. In certain illustrative embodiments, the chemicals can be injected from a delineation well or from a newly drilled horizontal well at the top of the reservoir. The steam injector could also be converted into a producer at this point. In a vertical well scenario, such as when implementing cyclic steam stimulation for a heavy oil field, a horizontal well could be drilled at the top of the reservoir to increase the area swept by this proposed blowdown method.

In certain illustrative embodiments, the selected blend of chemicals can include a glycol/water mixture. The injected mixture can sweep the reservoir from the top down to the location of the horizontal producer. As the glycol moves through the depleted steam chamber, it can scavenge heat left behind in the reservoir. The glycol can also adsorb some water along the way. Some oil can also be produced due to the glycol push using the gravity forces through the steam chamber. The produced glycol can be separated and the adsorbed heat can be used to generate more steam. It has been estimated in reservoir simulation studies that about one third of the injected heat (in the form of steam) is generally left behind in the reservoir. If a considerable amount of this heat can be adsorbed onto the glycol according to the presently disclosed blowdown method, it can have a significant impact on project economics.

In certain illustrative embodiments, the selected blend of chemicals can also include a viscosifying agent. For example, a viscosifying agent such as glycerol or polymer in water can also be injected into the reservoir after the glycol/water mixture has been injected into the reservoir for a period of time. The viscosifying agent can be injected from a delineation well or a horizontal well at the top of the pay zone. The viscosifying agent can provide a viscous drive that improves the sweep efficiency of the reservoir and to yield an incremental oil recovery.

In certain illustrative embodiments, the glycol can be ethylene glycol, but other glycols such as propylene glycol could also be used for this blowdown process. Any polyol including but not limited to glycerol or a polymer such as polyacrylamide or polysaccharide can also be used. Polyols are preferred because they are typically less expensive than commercially available polymers for enhanced oil recovery applications. Polyols/glycerol and their derivatives are also less toxic and more environmentally friendly. They are more readily available since glycerol is a byproduct of biodiesel. Also, glycerol is completely soluble in water, but not in oil, and therefore would not create stable emulsions that are difficult to process. Glycols are only weakly toxic and are readily available as well. Glycols are also less expensive than most other chemicals such as polymers or surfactants used in enhanced oil recovery operations.

The presently disclosed blowdown method can provide additional oil recovery as well as scavenge heat that is left behind in the reservoir. As a result, the proposed blowdown method can reduce operational costs and improve overall project economics. The blowdown method can be implemented in any heavy oil reservoir where a thermal recovery process has been implemented.

At least one embodiment is disclosed herein. Variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it may be understood that the disclosed embodiments might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, the various embodiments described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience: U.S. Pat. Pub. No. 2014/0332209 (Wickramathilaka); "Polyol for Improving Sweep Efficiency in Oil Reservoirs" (published Nov. 13, 2014); Assignee: ConocoPhillips Company, Houston, Tex.

What is claimed is:

1. A method of blowdown for a steam chamber of a thermal recovery process, the method comprising:
   producing oil from a well using a thermal recovery process and steam injection to create a steam chamber;
   reducing steam injection and reducing pressure in the steam chamber during blowdown;
   introducing a blowdown mixture into the steam chamber during blowdown, the blowdown mixture comprising glycol and water;
   adsorbing heat from the steam chamber onto the blowdown mixture;
   introducing a viscosifying agent into the steam chamber during blowdown;
   emulsifying oil from the steam chamber with the viscosifying agent to produce oil or emulsions thereof; and
   recovering the blowdown mixture and residual oil or emulsions thereof from the steam chamber during blowdown.

2. The method of claim 1, wherein the heat from the steam chamber is adsorbed onto the glycol in the blowdown mixture.

3. The method of claim 1, wherein the blowdown mixture and the viscosifying agent are introduced into the steam chamber after shut-in.

4. The method of claim 1, wherein a temperature of steam injection into the steam chamber is reduced prior to blowdown.

5. The method of claim 1, wherein an injector well and a producer well are adjacent to the steam chamber.

6. The method of claim 4, wherein steam injection into the steam chamber occurs via the injector well.

7. The method of claim 4, wherein the blowdown mixture and the oil or emulsions thereof are recovered from the producer well.

8. The method of claim 4, wherein the blowdown mixture and the oil or emulsions thereof are recovered from both the producer well and the injector well.

9. The method of claim 1, wherein the thermal recovery process comprises one or more of steam assisted gravity drainage, expanding solvent steam assisted gravity drainage and cyclic steam stimulation.

10. The method of claim 1, wherein the blowdown mixture and the viscosifying agent travel through the steam chamber via gravity drainage.

11. The method of claim 1, wherein the blowdown mixture and the viscosifying agent are injected into the steam chamber from one or more of a delination well or a horizontal well.

12. The method of claim 11, wherein the horizontal well is above the steam chamber.

13. The method of claim 1, wherein the viscosifying agent comprises a polyol.

14. The method of claim 1, wherein the polyol comprises one or more of glycerol, a polymer in water, or a combination thereof.

15. The method of claim 14, wherein the glycerol comprises one or more of ethylene glycol and propylene glycol.

16. The method of claim 14, wherein the polymer comprises one or more of polyacrylamide and polysaccharide.

17. A method of recovering primary oil and residual oil from a steam chamber in an oil sand reservoir, the method comprising:
   applying a thermal recovery process to the oil sand reservoir, wherein the thermal recovery process includes steam injection into the steam chamber;
   recovering primary oil from the steam chamber;
   terminating steam injection into the steam chamber during blowdown;
   introducing a blowdown mixture and a viscosifying agent into the steam chamber during blowdown;
   adsorbing heat from the steam chamber onto the blowdown mixture;
   emulsifying a residual oil in the steam chamber with the viscosifying agent; and
   recovering the blowdown mixture and the residual oil or emulsions thereof from the steam chamber.

18. The method of claim 17, wherein the thermal recovery process comprises one or more from the group consisting of steam assisted gravity drainage, expanding solvent steam assisted gravity drainage and cyclic steam stimulation.

* * * * *